United States Patent [19]
Yonnet

[11] Patent Number: 5,460,196
[45] Date of Patent: Oct. 24, 1995

[54] FLUID SUPPLY PRESSURE CONTROL METHOD AND APPARATUS

[75] Inventor: Claude Yonnet, Matlock, Great Britain

[73] Assignee: Technolog Limited, Derbyshire, England

[21] Appl. No.: 74,655

[22] Filed: Jun. 8, 1993

[30] Foreign Application Priority Data

Jun. 9, 1992 [GB] United Kingdom ............... 9212122

[51] Int. Cl.$^6$ ........................... F16K 31/12; F15B 13/044
[52] U.S. Cl. ...................... 137/12; 137/487; 137/487.5; 137/489.5; 251/29
[58] Field of Search ................ 137/12, 487, 486, 137/485, 487.5, 488, 489.5; 251/29

[56] References Cited

U.S. PATENT DOCUMENTS

| | | | |
|---|---|---|---|
| 2,023,503 | 12/1935 | Baas | 50/10 |
| 3,136,333 | 6/1964 | Griswold | 251/29 X |
| 3,369,561 | 2/1968 | Zimmerman et al. | 137/486 |
| 4,200,911 | 4/1980 | Matsumoto | 364/105 |
| 4,304,389 | 12/1981 | McLeod | 251/29 |
| 4,394,871 | 7/1983 | Czajka et al. | 137/115 |
| 4,796,651 | 1/1989 | Ginn et al. | 137/487 X |
| 4,961,441 | 10/1990 | Salter | 137/14 |
| 5,047,965 | 9/1991 | Zlokovitz | 364/558 |
| 5,097,858 | 3/1992 | Zlokovitz et al. | 137/14 |

FOREIGN PATENT DOCUMENTS

| | | |
|---|---|---|
| 37 25 635 | 11/1989 | Germany . |
| 2123983 | 2/1984 | United Kingdom . |
| 2252848 | 8/1992 | United Kingdom . |

*Primary Examiner*—Martin P. Schwadron
*Assistant Examiner*—Kevin L. Lee
*Attorney, Agent, or Firm*—Pravel, Hewitt, Kimball & Krieger

[57] ABSTRACT

A fluid supply pressure control apparatus for use in conjunction with a pressure control valve (10) of a fluid supply system is disclosed which includes: first sensor means (26, 28) for sensing the pressure of the fluid at a first point (12, 14) in the system, and first control means (16) for controlling the pressure control valve (10) to adjust the pressure of the fluid at the first point in the system in accordance with a difference between the pressure sensor by the first sensor means and a predetermined pressure valve. The apparatus further includes second control means (24) for controlling the predetermined pressure value to reduce fluctuations in the fluid pressure at a second point in the system.

The aim of this apparatus is to maintain the lowest possible pressure in the supply pipes commensurate with maintaining a reasonable pressure in outlying and elevated areas and with meeting the demand for water. This provides a means of controlling water supply pressure whereby water loss through leakage is likely to be substantially reduced.

28 Claims, 12 Drawing Sheets

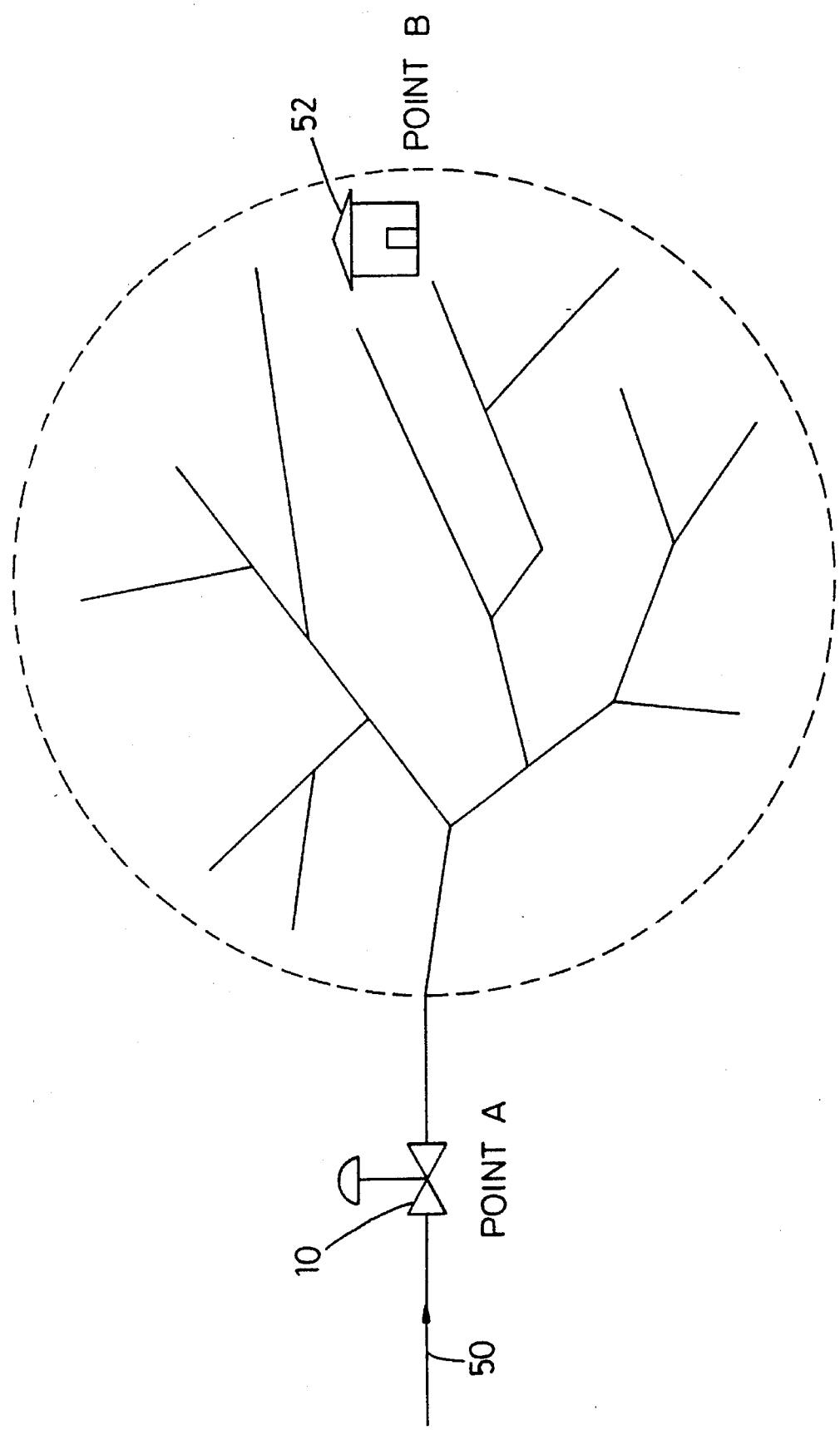

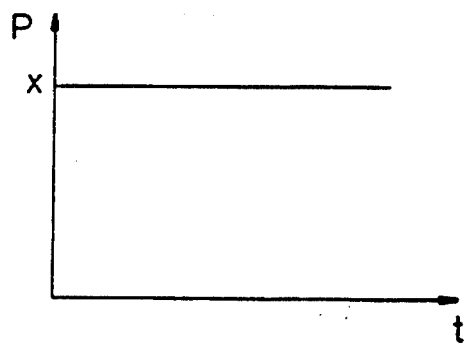
Fig 2.1a
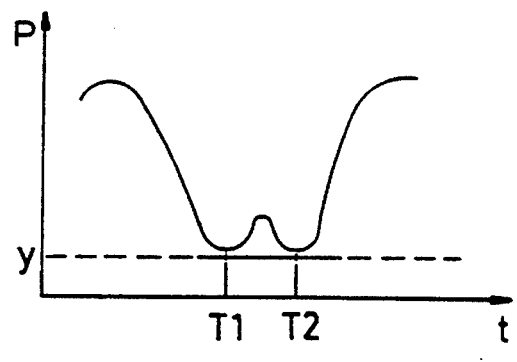
Fig 2.1b
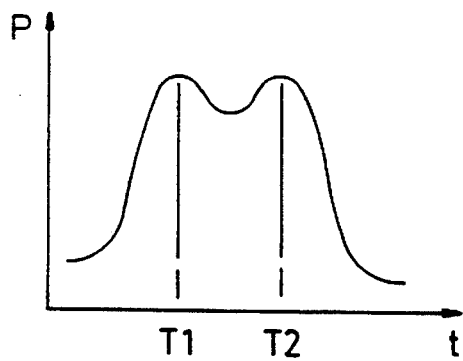
Fig 2.2a
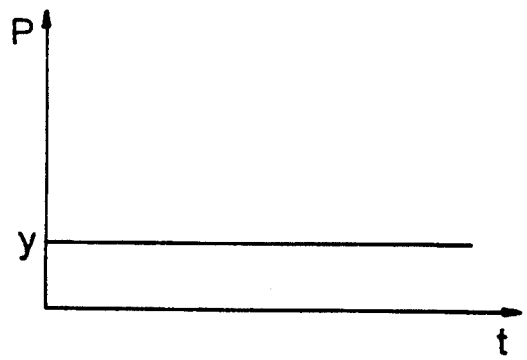
Fig 2.2b

FLUID SUPPLY PRESSURE CONTROL METHOD AND APPARATUS

FIELD OF THE INVENTION

The invention relates to a fluid supply pressure control method and apparatus, and in particular to such a method and apparatus for a water supply system. The term fluid includes both liquids and gases.

BACKGROUND ART

The supply and pressure control of mains water is a fairly complex operation and the adequacy of the supply and supply infrastructure varies from place to place. Conventionally the water system is arranged so that a minimum water pressure is maintained at all points in the system.

This is usually done with reference to the pressure prevailing at a number of critical points, that is to say at those points which are the highest above sea level or furthest away from the source of supply in the district concerned. However, there is invariably a considerable fluctuation in the demand for water throughout the day and also a considerable seasonal variation so that the maximum pressure is generally higher than the necessary minimum value.

A conventional system as previously described suffers from a number of problems, including the loss of significant quantities of water because of the poor condition of pipes in the distribution network, either due to their age or the materials of which they are constructed. The maintenance of a higher than necessary pressure level at a particular point increases the amount of water so lost and, additionally, exacerbates the deterioration of the system.

For a particular pipe network, it is known to include a regulating valve to maintain a predetermined pressure level at the valve location, and it is also known to include a mechanical control device to keep this pressure level to a minimum. However, once installed such mechanical control devices cannot be easily adjusted and thus if the characteristics of the system are altered in any way e.g. by the addition of further piping or supply requirements, then the controller can not take account of this and the pressure level is not maintained at an optimum value.

OBJECT OF INVENTION

The present invention aims to combat this problem by preferably maintaining the lowest possible pressure in the supply pipes commensurate with maintaining a reasonable pressure in outlying and elevated areas and with meeting the demand for water. This provides a means of controlling water supply pressure whereby water loss through leakage is likely to be substantially reduced, and deterioration alleviated.

SUMMARY OF INVENTION

Accordingly the present invention provides a fluid supply pressure control apparatus for use in conjunction with a pressure control valve of a fluid supply system, including: first sensor means for sensing the pressure of the fluid at a first point in the system, and first control means for controlling the pressure control valve to control the pressure of the fluid at the first point in the system in accordance with a difference between the pressure sensed by the first sensor means and a predetermined pressure value, characterised in that the apparatus includes second control means for controlling the predetermined pressure value.

Advantageously, the predetermined pressure value is adjustable by the second control means to reduce fluctuations in the fluid pressure level at a second point in the system. The fluctuations may be reduced in frequency, duration or any other suitable manner.

The first control means may include means e.g. for hardware or software, for controlling the pressure control valve directly or indirectly, or may include a valve such as a pilot valve.

Typical loss levels in a water supply system can typically be between 20% and 40% of total water supplied and may be even higher. In a system which incorporates a fluid supply pressure control apparatus according to the present invention, this loss can be reduced by as much as half. Not only does this save water loss but also may increase the life span of the fluid supply system.

In some practical embodiments of the present invention, the pressure control valve may be a pressure reducing valve or a pressure sustaining valve.

In a first aspect of the present invention ("pressure/time modulation control"), the apparatus preferably includes first storage means for storing data relating to a required fluid pressure/time relationship, known as pressure/time profiles. The predetermined pressure value is then adjustable by the second control means in accordance with said fluid pressure/time data.

The predetermined pressure-time profiles will typically be derived from historical data, possibly relating to a remote point or points in the system. Such profiles may be downloaded into the memory for any desired period; a week might be suitable to allow for diurnal changes and week-end load patterns. Furthermore, while one profile may be sufficient to compensate for daily/weekly variations in water demand, different profiles may generally also be required for use according to the time of the year, and to meet abnormal demands for water.

In order to be self-regulating, a plurality of different profiles may be stored in the memory to represent changes in seasonal conditions, eg. a winter profile, a summer profile and a spring/autumn profile. In an autonomous system such as this the switching of profiles can be triggered, for example, by:

1) the changing seasons of the year (especially in areas the population of which increases greatly from time to time because of tourism)
2) variations in the distribution system, that is to say, for example, the feeding of water to a district from an alternative source of supply.

In order to cope with abnormal demands or an emergency situation, the first aspect may include switching means for switching the second control means to an alternative state wherein the predetermined pressure value is no longer adjustable in accordance with said pressure/time data. Instead the pressure may be increased by a fixed amount, or a different pressure profile may be substituted.

In a second aspect of the present invention a fluid supply pressure control apparatus according to the present invention may include second sensor means for sensing the fluid flow at a first point in the system, and first storage means for storing data relating to a required fluid pressure/flow relationship. The predetermined pressure value is then adjustable by the second control means in accordance with the fluid pressure/flow data.

Since for a particular system a particular amount of flow can be approximately known to be resulting in a certain pressure at any given point in the system, if the flow is measured then the pressure needed at a first (supply) point to maintain a certain pressure at a second (consumer) point can be calculated. The second control means therefore contains data relating required pressure to amount of flow.

An apparatus according to this second aspect is particularly useful in situations where emergency load on the system needs to be accommodated e.g. where fire conditions are anticipated, since the controller will preferably automatically adjust to increase pressure levels and hence increase flow.

The second sensor means may include a fluid flow meter locatable at a first point in the system or alternatively may include detector means to detect an operation or parameter of the pressure reducing valve and pressure sensor means to sense fluid pressure of the fluid both upstream and downstream of the pressure reducing valve.

In the latter case, the detector means preferably sense the position of the pressure control valve (which is flow proportional) and the pressure sensor means sense the pressure drop across the valve. From these measurements the fluid flow through the valve can be calculated if the necessary characteristics of the valve are known.

The second aspect preferably includes second storage means in which measurements of flow from the second sensor means are storable. These measurements are averageable over a period of time, possibly by the second control means, to produce an average fluid flow value, from which the pressure calculations may then be made.

The following discussion relates to either of the two above aspects of the present invention.

The first control means may include a pilot valve for controlling the pressure reducing valve. The pilot valve can be located in an auxiliary flow pipe, the opposite ends of which are connected to tapping points respectively upstream and downstream of the pressure reducing valve, and the pilot valve is preferably regulated by the second control means.

The second control means may control the pilot valve by adjusting the pressure in a pipeline communicating with a diaphragm chamber of the pilot valve. This pressure may be controllable by a pair of electrically operated valves arranged in series with the pipeline joining a connecting line between the valves. One of the valves can be connected to a relatively high pressure source and the other to a relatively low pressure source and the control pressure in the pipeline is controllable by selective operation of the pair of valves.

Either or both of the two valves may be normally closed solenoid valves, which operate by trapping a sealed volume at a known pressure. The solenoids can be pulsed to increase or decrease the pressure and hence adjust the hydraulic set point of the pilot valve. In this way, power is only used when adjusting the solenoids—once the hydraulic set point is fixed the pressure control valve and pilot valve continue to function as normal.

By controlling the pilot valve in this manner, the pressure in the system is controllable using low power devices. A fluid supply control apparatus according to the present invention may be battery powered and it is possible to run the apparatus for 3–5 years on the power of a small battery. This allows the apparatus to be located in the vicinity of a pressure control valve with no need for mains power connection. Possibly the battery may be located remote from the control apparatus e.g. nearer to the surface of the ground, and therefore more accessible for repair or replacement.

The control applied to the pilot valve will preferably be applied in pulses, the duration of the pulses being varied according to an error signal represented by the difference between required and sensed pressure. Preferably, also, the control applied to the pilot valve will be applied according to a threshold concept, that is to say so that the control only becomes operative when the downstream pressure strays outside a predetermined error band.

The second control means (possibly a data logger or controller) may be "self-taught" i.e. may be such that it applies a control signal for an elementary period of time, measures the resultant change of pressure in relation to the change of pressure required, and then performs a control function for an appropriate period of time to bring about the change required.

Preferably the fluid supply pressure control apparatus includes memory means for storing data relating to the operation of the apparatus. This memory may be accessed, for example, either directly or by telemetry.

Any or all of: the first control means, the second control means, the first storage means, the second storage means, and the memory means may include a data-logger or a computer.

In a third aspect, the present invention relates a method of controlling the fluid pressure level at a second point in a fluid supply system including the steps of:

(i) sensing the pressure of the fluid at a first point in the fluid supply system using first sensor means, (ii) using first control means to control the pressure control valve to control the pressure of the fluid at the first point in the system in accordance with a difference between the pressure sensed by the first sensor means and a predetermined pressure value, and (iii) using second control means to control the predetermined pressure value.

In a pressure/time modulation control method, the second control means adjusts the predetermined pressure value in accordance with data relating to a required fluid pressure/time relationship.

In a flow modulation control method, fluid flow sensing means are used to sense the fluid flow at the first point in the system and the predetermined pressure value is adjusted by the second control means in accordance with data relating to a required fluid pressure/flow relationship.

BRIEF DESCRIPTION OF DRAWINGS

Aspects of the present invention are discussed in terms of a water supply system but are also applicable to other fluid supply systems e.g. gas supply systems.

Embodiments of the present invention will now be described with reference to the accompanying drawings in which:

FIG. 1 is an schematic representation of a typical water supply system;

FIGS. 2.1a, 2.1b, 2.2a and 2.2b shows a number of pressure/time graphs for two points in a water supply system both with and without a fluid supply pressure control apparatus according to an embodiment of the present invention;

DETAILED DESCRIPTION OF EMBODIMENTS

Figure 3A:
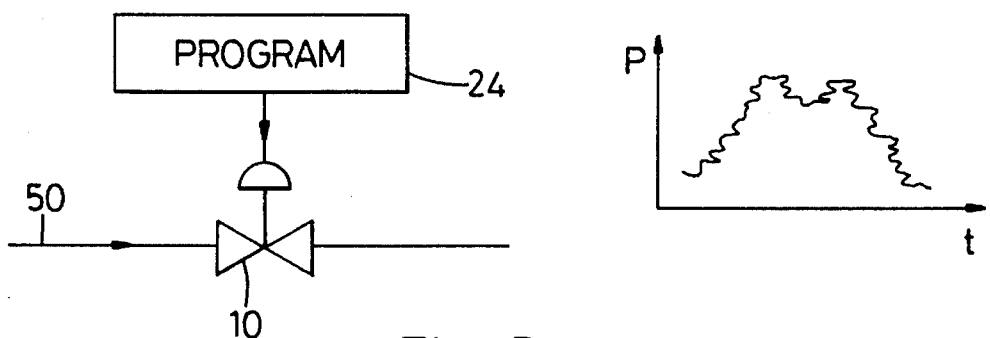
FIGS. 3a, 3b and 3c shows schematically three embodiments of the present invention.

FIG. 1 shows a schematic view of one example of a water supply system. The main water supply is along pipe 50, and the pressure at point A is regulated by a valve 10. The water is then supplied to a number of end users, one of the farthest away of which (point B) is denoted by number 52.

It will be appreciated that the demand for water fluctuates throughout the day, and also may vary with the day of the week and time of year.

In a typical supply system a certain amount of water (possibly between 20% and 40%) is lost through leakage e.g. due to deteriorated pipes. The amount of leakage depends upon the water pressure at any particular point in the system—leakage increasing with pressure. If there is a reduction in flow/demand then the pressure in the system rises and leakage increases—as does the stress or wear and tear on the distribution network.

As flow causes a reduction in pressure, consequently the pressure at point B is less than that at point A. Furthermore, since the pressure drop increases with the amount of flow then the pressure drop will be greatest at times of largest flow. This can be seen from the graphs of FIGS. 2.1a–2.2b. The aim of the invention is to control the pressure to account for this pressure drop.

In the pressure/time modulation control method, the second control means adjusts a predetermined pressure value in accordance with data relating to a required fluid pressure/time relationship.

In the flow modulation method fluid flow sensing means are used to sense the fluid flow at the first point in the system and a predetermined pressure value is adjusted by the second control means in accordance with data relating to a required fluid pressure/flow relationship.

FIG. 2.1a is a graph of pressure against time for the water pressure at point A in FIG. 1 in a conventional water supply system. In a conventional system this is maintained at a relatively high constant level (given a value x). It is kept at this high level in order to ensure that at all times the water pressure at point B does not drop below a predetermined minimum level (value y in FIG. 2.1b).

FIG. 2.1b shows the typical pressure/time distribution at point B throughout a day. At times of lowest use e.g. early morning and late evening, the pressure drop is reduced and the pressure at point B is at its highest levels. Correspondingly at times of greatest use (T1, T2) the pressure drop is at a maximum and the pressure at point B is at its lowest value (value y).

The present invention aims to reduce the fluctuations in pressure level at point B and to keep the pressure at point B to a minimum at any particular time. In doing this the amount of leakage can be reduced and the lifetime of the pipework prolonged. Reductions of up to 50% in the amount of leaked water may be achieved.

FIG. 2.2b shows an ideal situation where the pressure level at point B is kept to a value y at all times. In order to achieve this, the pressure at point A is varied throughout the day according to the relationship shown in FIG. 2.2a. At times when the fluid flow is greatest, and consequently the loss and pressure drop also greatest, (times T1 & T2) the pressure at point A must be increased. At other times the pressure at point A can be reduced accordingly.

Figure 3B:
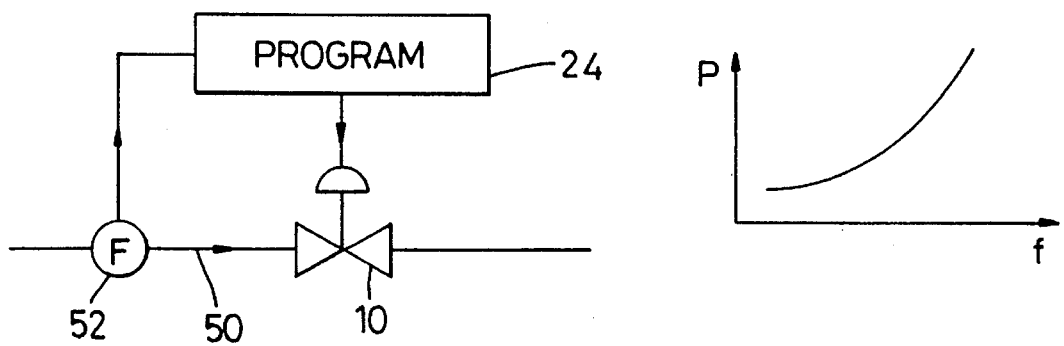
Figure 3C:
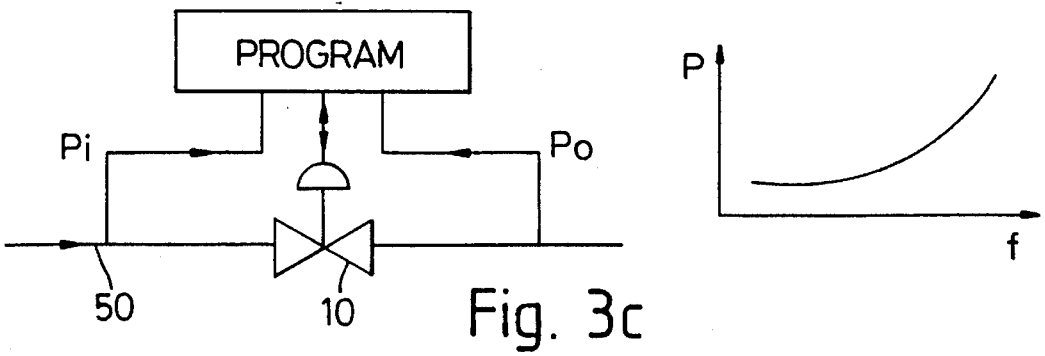

The present invention contemplates two ways of controlling the pressure at point A in order to reduce fluctuations in pressure at point B: "pressure/time profile modulation" and "flow modulation". FIGS. 3a–3c shows schematic representations of one implementation of pressure time profile modulation (FIG. 3a) and two representations of implementations of flow modulation (FIG. 3b and FIG. 3c).

In FIG. 3a the pressure at point A is controlled by the valve 10 which is in turn controlled by a control unit 24. The control unit 24 stores a number of pressure/time profiles relating to that particular system and in addition receives data about the current pressure level at point A.

The predetermined pressure-time profiles will typically be derived from historical data. Such profiles may be downloaded into the memory for any desired period; a week might be suitable to allow for diurnal changes and week-end load patterns. Furthermore, while one profile may be sufficient to compensate for daily/weekly variations in water demand, different profiles will generally also be required for use according to the time of the year, and to meet abnormal demands for water.

In order to be self-regulating, a plurality of different profiles can be stored in the memory to represent changes in seasonal conditions, eg. a winter profile, a summer profile and a spring/autumn profile. In an autonomous system such as this the switching of profiles can be triggered, for example by:

1) the changing seasons of the year (especially in areas the population of which increases greatly from time to time because of tourism)

2) variations in the distribution system, that is to say, for example, the feeding of water to a district from an alternative source of supply.

FIG. 3b shows one embodiment of a flow modulation control, where the controller 24 also receives data from a flow meter 52 which measures the flow of fluid in the pipe 50. Since for a particular system a particular amount of flow can be known to be causing a certain pressure drop, if the flow is measured then the pressure needed at point A to maintain a certain pressure at point B can be calculated. The controller 24 therefore contains data relating required pressure to amount of flow. A typical graph is seen in figure 3b where the required pressure increases according to flow at a rate greater than linearly.

FIG. 3c shows an alternative method of implementing flow modulation control. Typically the valve 10 has a stem connected to whatever member is used to open and close the valve aperture. Thus, as the aperture is adjusted, the stem moves up and down. Therefore if the characteristics of the particular valve are known then the flow through the valve can be inferred from the position of the stem and the pressure differential across the valve. In this embodiment the controller 24 receives pressure information from both upstream and downstream of the valve 10 and in addition receives position information relating to the stem of the valve. The pressure calculations are then performed in a similar way to the embodiment of FIG. 3b.

Figure 4:
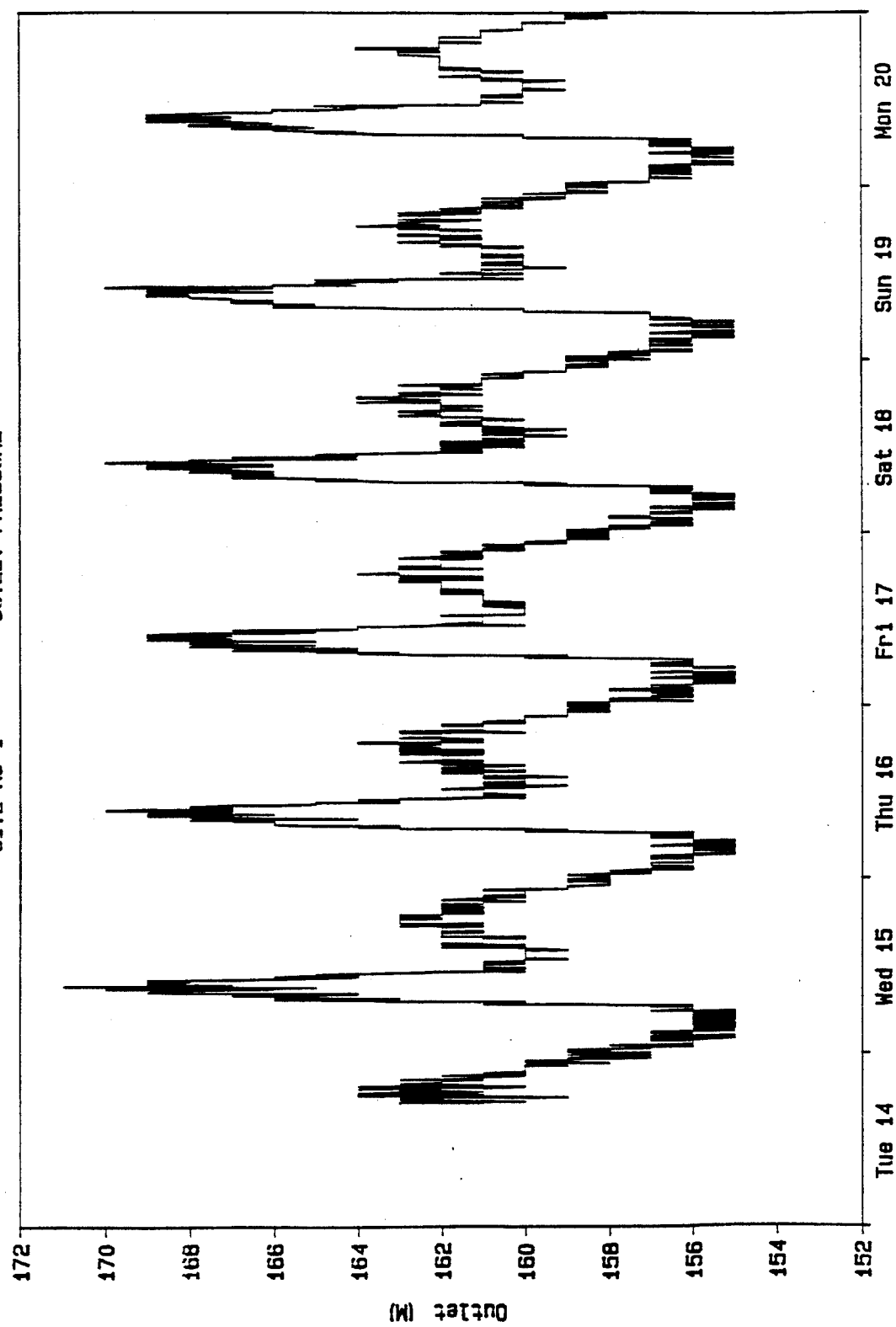
FIGS. 4–9 show graphs of outlet pressure (at a point A), critical node pressure (at a point B) and total fluid flow for two different sites.
Figure 5:
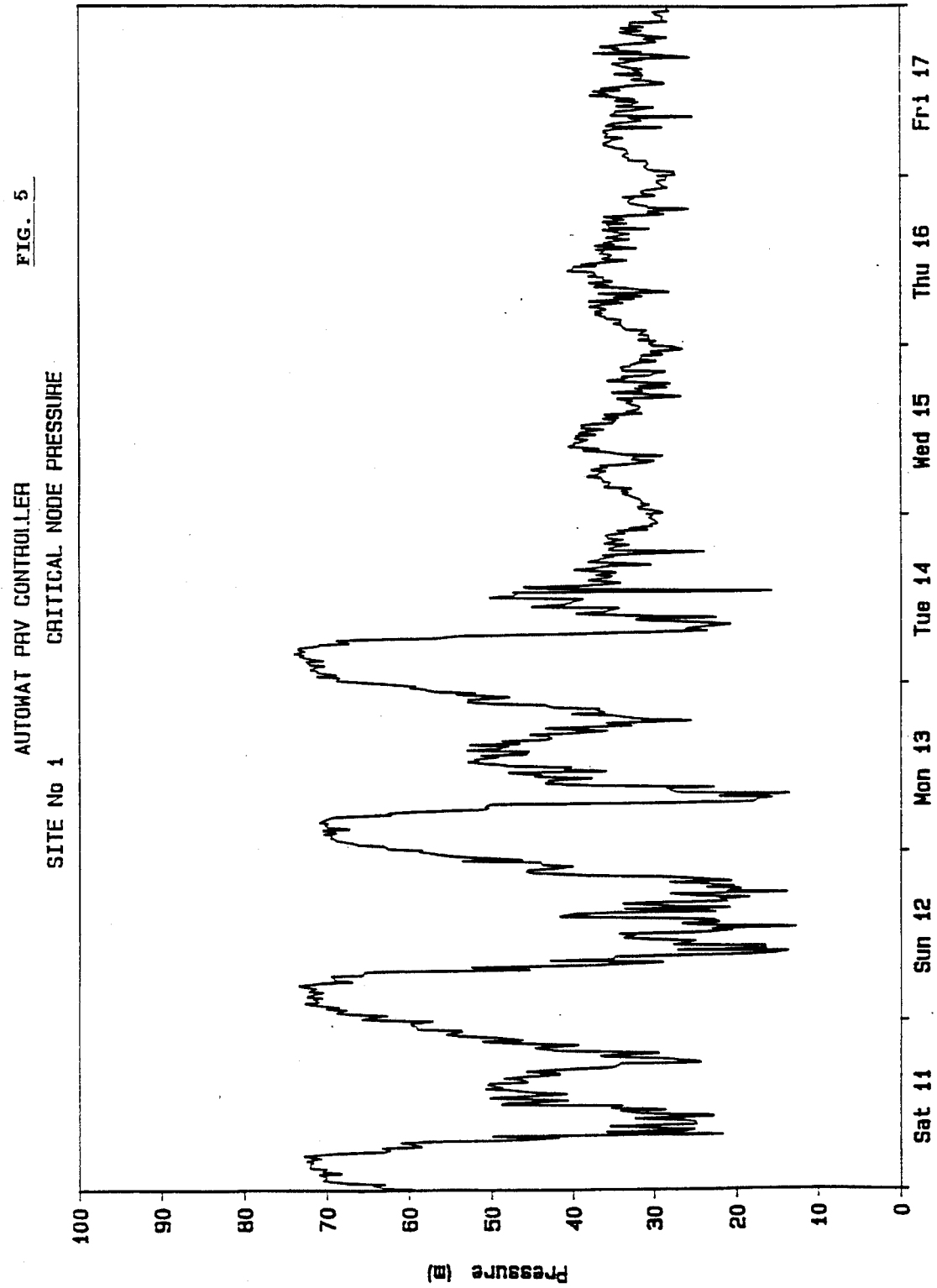
Figure 6:
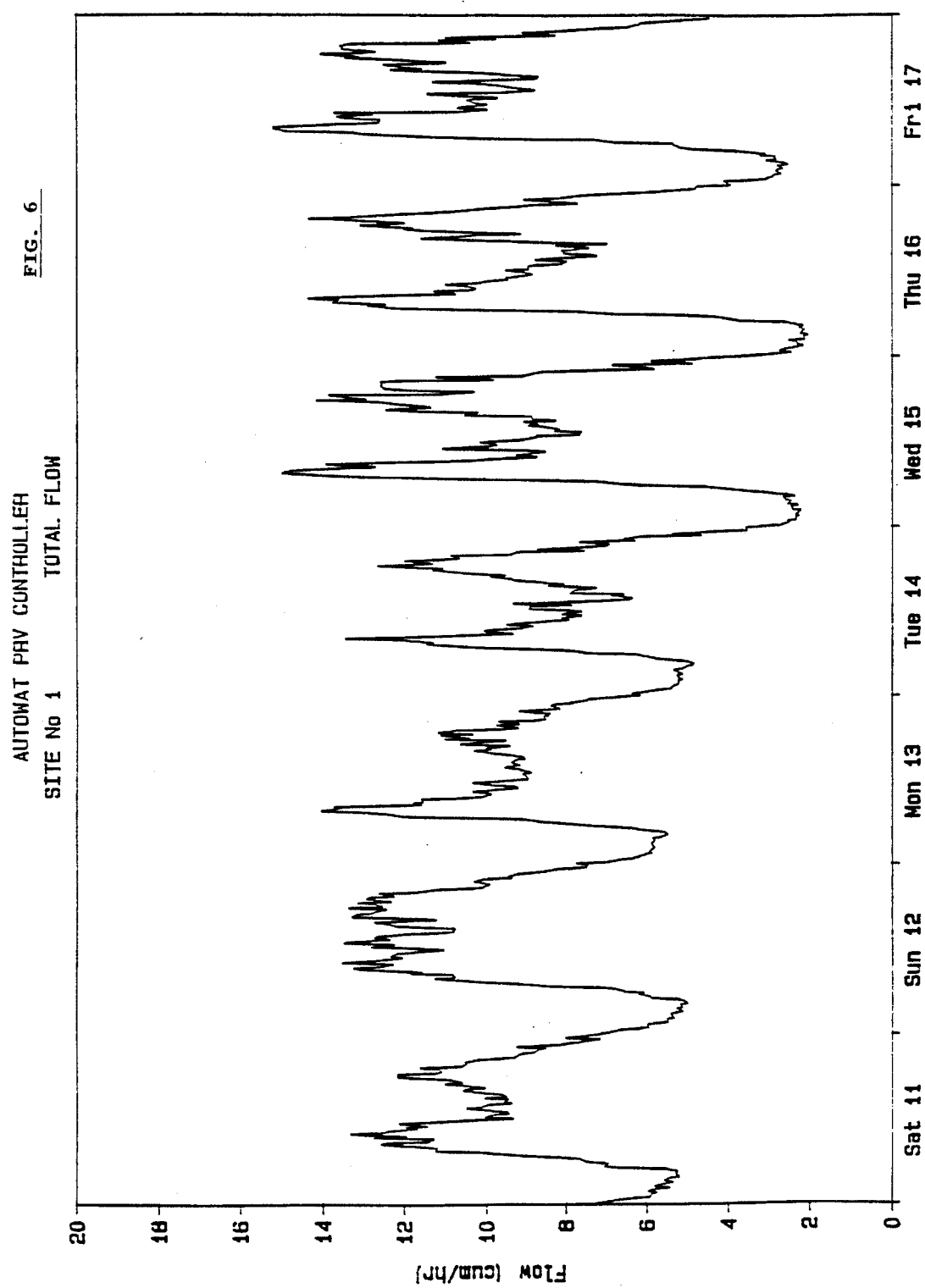

FIGS. 4 to 6 show graphs of outlet pressure (at point A), critical node pressure (at point B) and total amount of flow through the regulating valve respectively, for a first system.

For the first three days (Saturday through to Tuesday morning) the graphs show the operation of a system without a fluid pressure control apparatus according to the present invention. The critical node pressure can be seen to be varying widely between over 70 meters at times of low flow to below 20 meters at times of high flow.

At times when, in this example, the critical node pressure is below 20 meters the water supply company may have to compensate the consumer for loss of adequate pressure. However, in a conventional system, the supplier cannot merely increase the overall mean outlet pressure in order to raise the minimum critical node pressure above 20 meters, since this would result in a maximum critical node pressure (at times of low flow) of over 80 meters. This may result in increased deterioration of the system and even burst pipes during periods of high pressure.

For the following three and a half days (Tuesday morning until Friday) a fluid pressure control apparatus according to the present invention is used in the system. It can be seen that the total flow still allows for the demands of the consumer, but the outlet pressure varies in order to maintain a more level critical node pressure value. As a consequence of this the critical node pressure is maintained above the minimum 20 meter level and does not rise so dramatically at times of low flow.

In addition the amount of leakage is reduced, due to a reduction in the pressure at times of low flow. This is more apparent at times of little usage, when the flow is reduced to just over two cubic meters/hour. It is more noticeable at these points because at times of low demand most of the flow (possibly around 75%) is in fact leakage.

Figure 7:
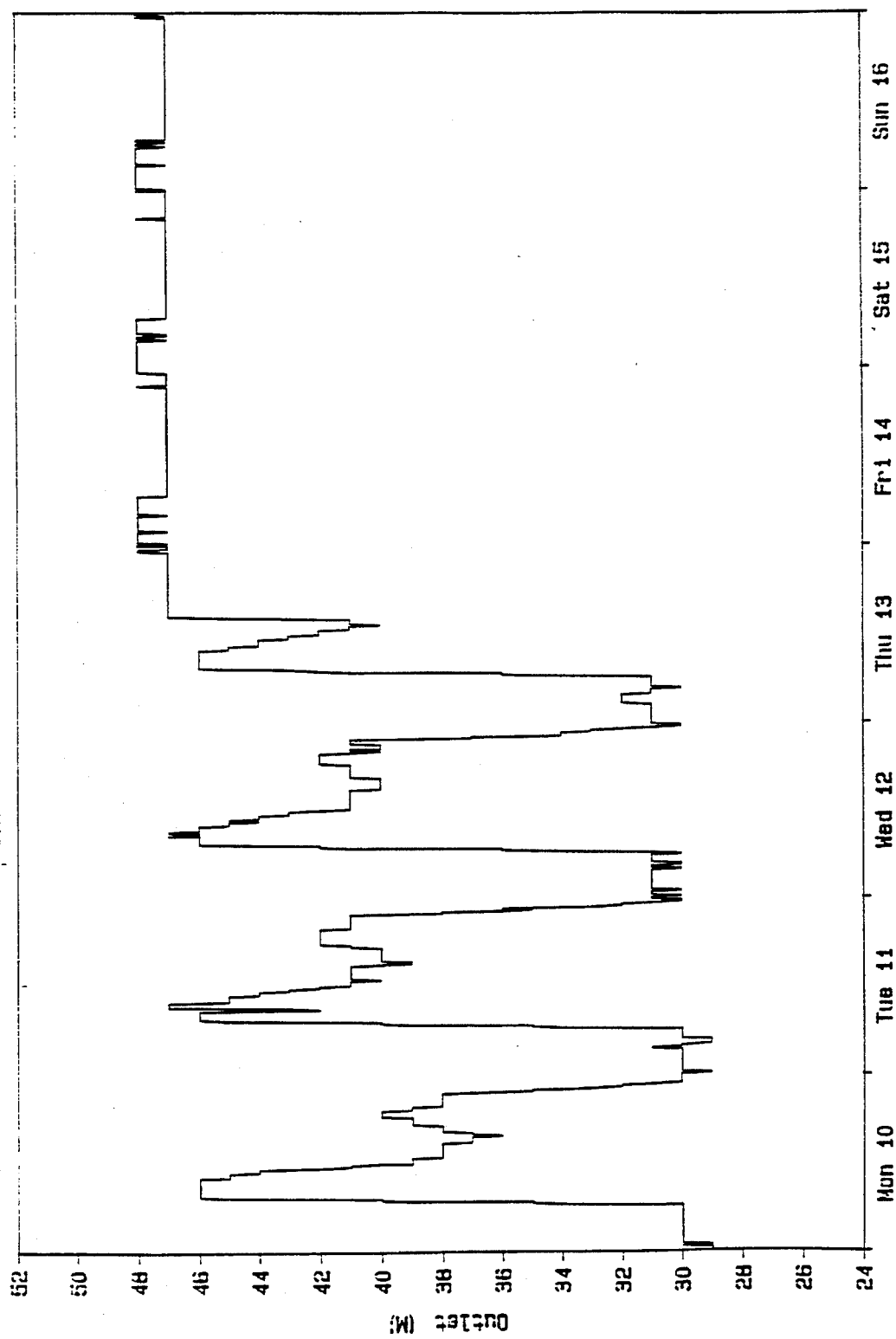
Figure 8:
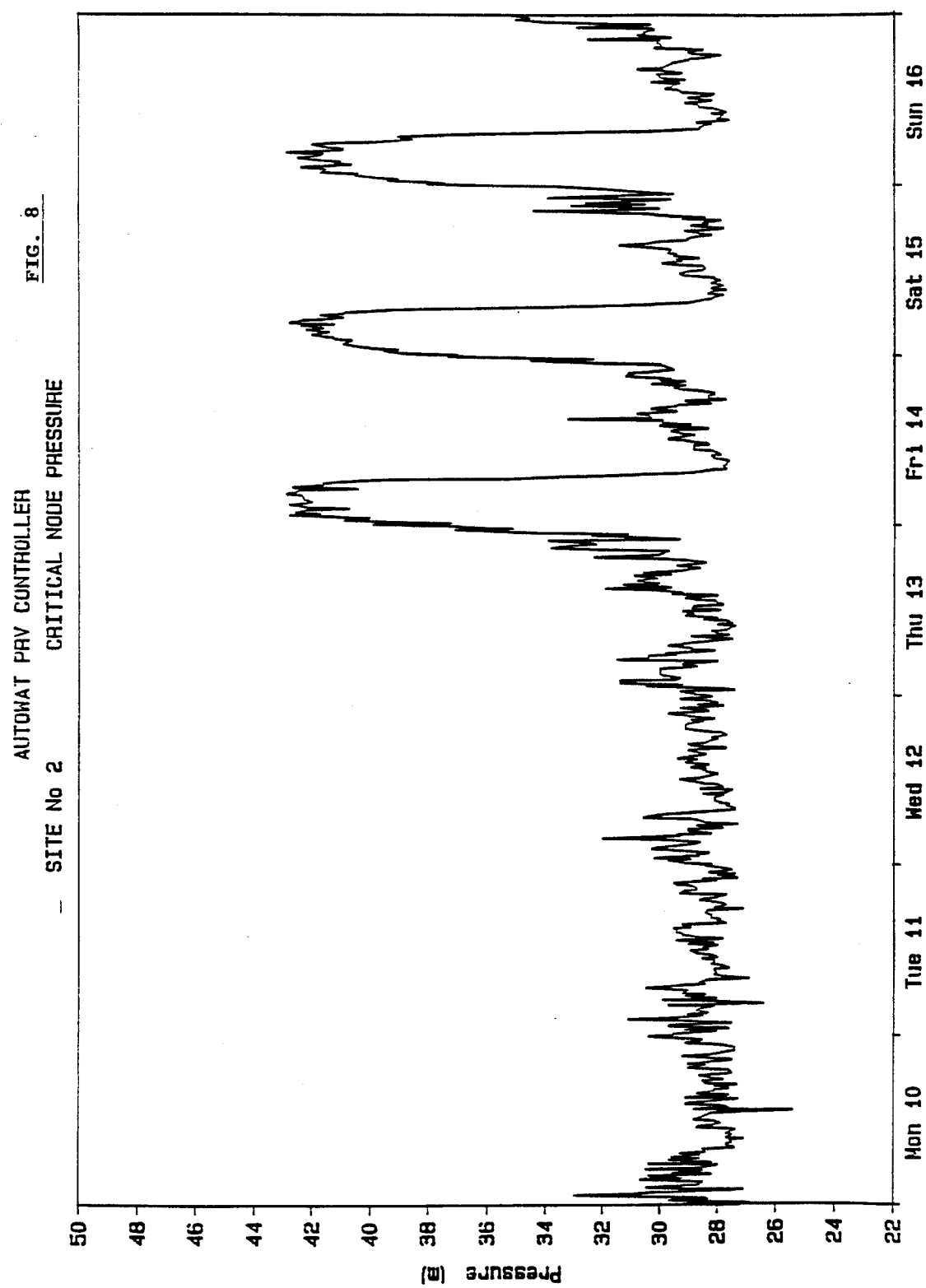
Figure 9:
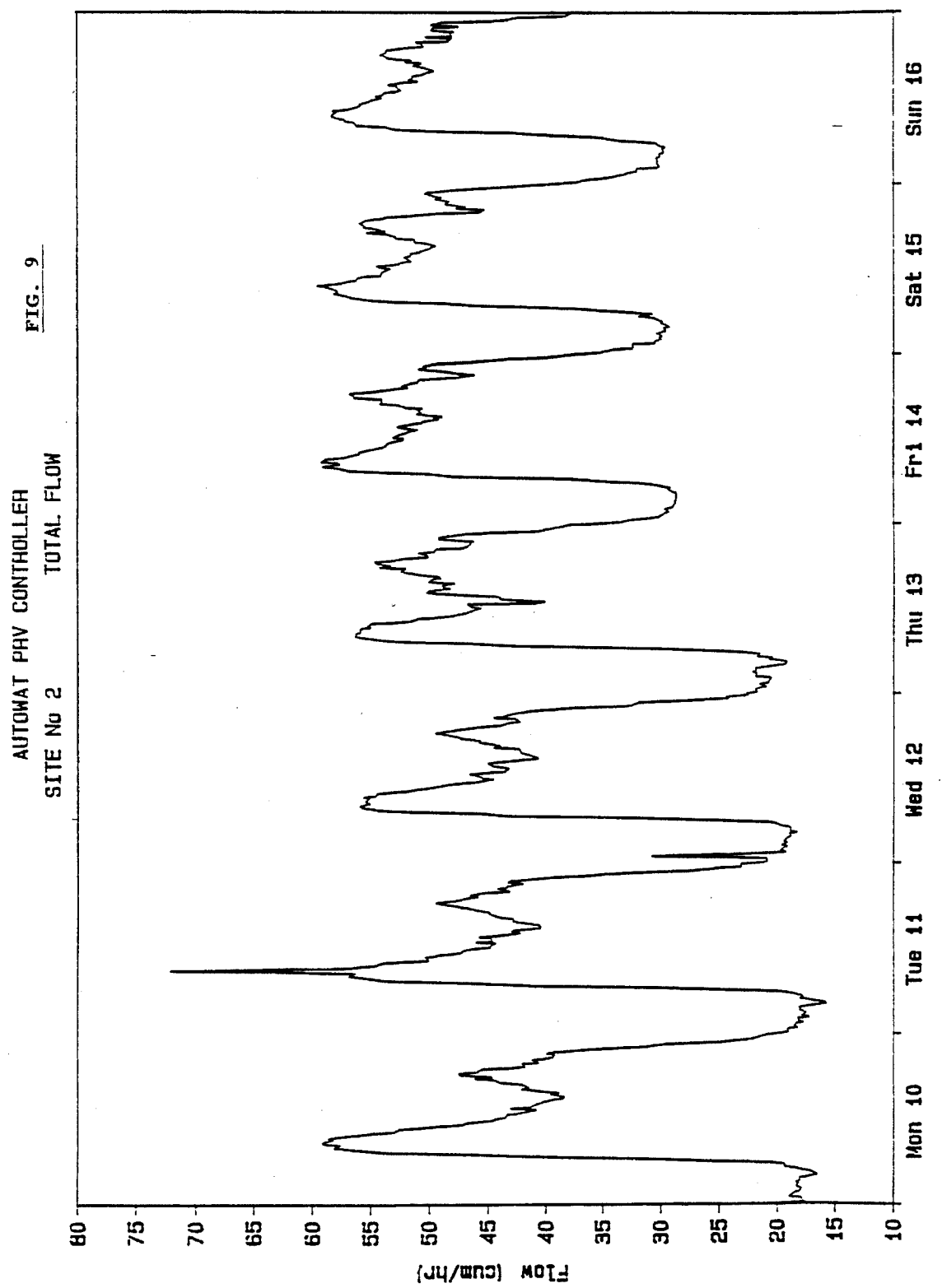

FIGS. 7 to 9 show a similar set of graphs for a second system. In these figures, for the first time period (Monday through to Thursday) a fluid supply control apparatus according to the present invention is used in the system. Again, the pressure at the critical node is kept to a more constant level and the outlet pressure is reduced from its maximum of around 46 meters to roughly 30 meters at times of low demand. For the time period Thursday evening through to Sunday the fluid supply system functions in a conventional manner and the outlet pressure is maintained at a roughly constant 46 meters. Consequently the critical node pressure rises to around 44 meters at times of low demand and the flow at times of low demand can be seen to rise to around 30 cubic meters/hour i.e. the wastage increases.

Figure 10:
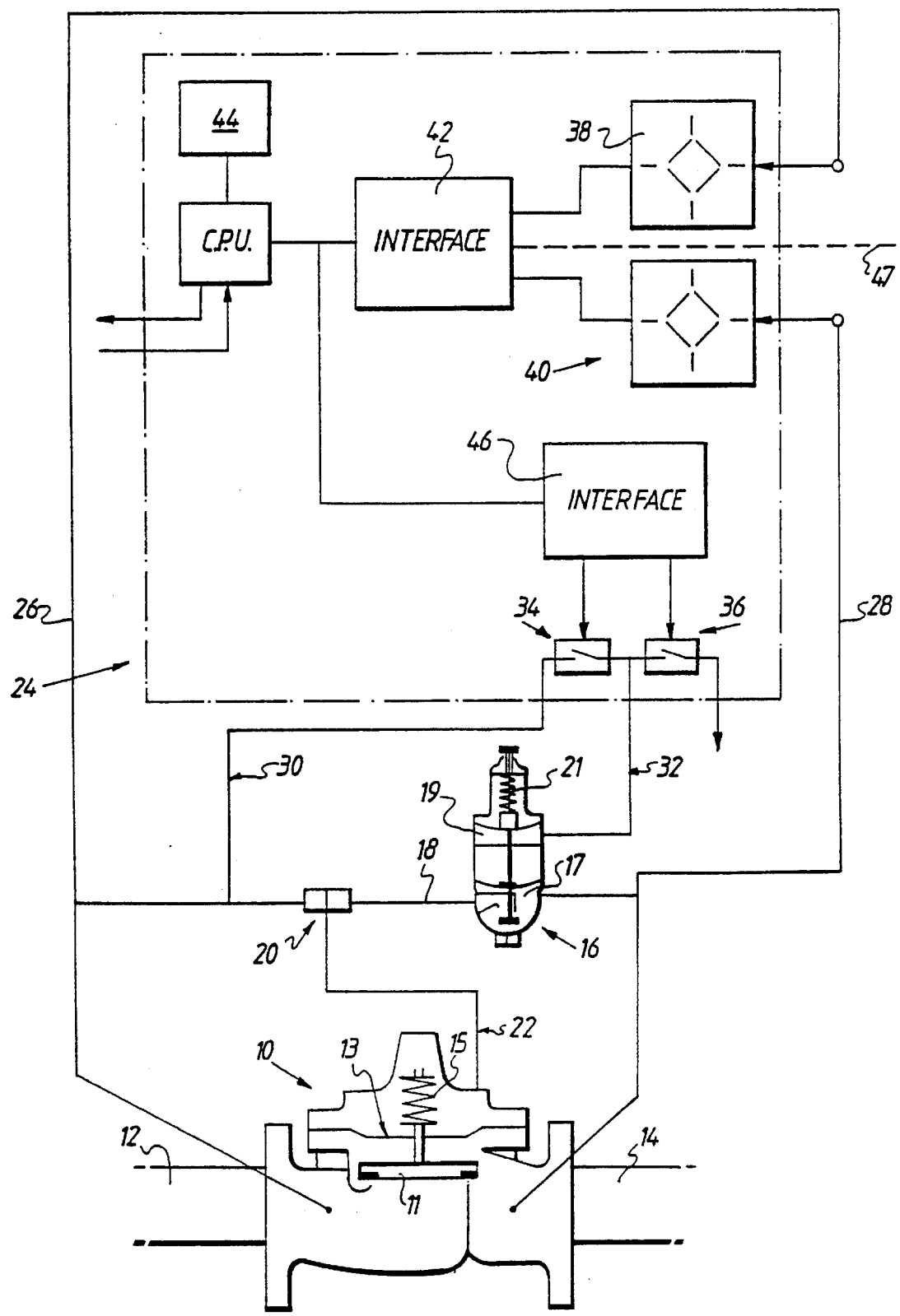
FIG. 10 shows a diagrammatic illustration of a fluid pressure control system according to an aspect of the present invention.

Referring now to FIG. 10, in the water pressure control system there illustrated the diaphragm operated pressure control valve 10 regulates the pressure differential between upstream main 12 and downstream main 14. The pressure control valve 10 may typically be a pressure reducing or sustaining valve.

The valve 10, which is a conventional diaphragm operated pressure control valve, is under the control of a pilot valve 16 located in an auxiliary flow pipe 18 the opposite ends of which are connected at tapping points respectively upstream and downstream of the closure member 11 of the control valve 10. A venturi 20 is provided in the auxiliary flowpipe and into it is connected a pipe 22 which communicates with the diaphragm chamber of valve 10.

In operation, the water outlet pressure acting on the underside of the diaphragm 13 of valve 10 is balanced by the force of spring 15 acting above it and by the water pressure communicating with the diaphragm chamber through pipe 22. A drop of pressure at the outlet side of valve 10 results in an increased flow of water through auxiliary flow pipe 18, this in turn reducing the pressure of water in the diaphragm chamber of valve 10 so that the latter is caused to open wider to restore the outlet pressure. An increase of outlet pressure beyond the pre-determined value adjusted by the setting of spring 15 results in a decreased flow of water through auxiliary flow pipe 18, this in turn increasing the pressure of water in the diaphragm chamber of valve 10 so that the latter is caused to partially close to restore the outlet pressure to the set pressure.

Conventionally, this apparatus would be used to maintain a constant pressure level at this point in the system.

The apparatus includes a pilot valve 16, which varies from a standard pilot valve in that it has two diaphragm chambers 17 and 19, whereas a normal pilot valve has only one. The pressure in the bias chamber is adjusted using two solenoids—one to increase pressure i.e. open to the inlet supply, and one to decrease pressure i.e. open to atmosphere. This will be described in more detail below.

In the two diaphragm chambers 17 and 19 of the pilot valve, the sum of the two pressures acting upwardly within said two diaphragm chambers is balanced by the force of the adjustable coil compression spring 21 acting downwardly on the closure member.

The downstream or district water pressure acts in the first diaphragm chamber 17 of the pilot valve and tends to restrict the flow through the valve 10 as the district pressure increases.

If the pressure in main 14 falls below the pressure setting of pilot valve 16, that is to say the mains pressure which the adjustment of spring 21 has been set to produce, the pilot valve opens further to increase the flow of water through the auxiliary flow pipe 18. This causes the valve 10 to open further in response to a lowering of pressure in pipe 22, thus restoring the pressure in main 14 to the pressure setting of pilot valve 16.

However, the pilot valve is itself regulated by an electronic control unit, generally indicated 24, which varies the pressure in a pipeline 32 communicating with the second diaphragm chamber 19 so that an increase of pressure in the pipeline 32 also tends to restrict the flow of water through the pilot valve, in either case the reduced flow of water through the auxiliary flow pipe 18 causing the pressure in pipe 22 to fall so that valve 10 will open further.

The electronic control unit, generally indicated 24, which regulates the pilot valve 16 may include a data-logger or computer for obtaining records of water supply to a district, in combination with additional software, or software plus hardware, for regulating the control of water pressure to the district concerned.

The electronic control unit 24 comprises respective input sections 38, 40 having pressure transducer means and analogue-digital conversion means for data inputs to a central processing unit (CPU) through interface 42. The control unit may perform the usual functions of a data-logger in storing data derived from the inputs 38, 40 in a memory 44 to permit telemetric readout of the data at intervals.

The control unit has connections through pipelines 26 and 28 for sensing the respective water supply pressures upstream and downstream of the control system. The unit is also provided with control connections through a pipeline 30 from the upstream end of the auxiliary flow pipe 18 and the pipeline 32 to the pilot valve 16.

The pressure in the pipeline 32 is determined by a pair of solenoid operated valves 34 and 36 arranged in series in the pipeline 30. The pipeline 32 joins the connecting line between the two solenoid operated valves, as shown. Water flowing through valve 36 (which may only be a very few drops of water at any one time) is dumped; the vent of valve 36 is therefore maintained at atmospheric pressure.

The control pressure in pipeline 32 is thus determined by the selective operation of the valves 34, 36 in the following manner:

The upstream end of the auxiliary flow pipe 18, being in communication with the water in main 12, is maintained at a pressure considerably higher than atmospheric pressure. Thus, by selective operation of the two solenoid operated valves 34 and 36, the water pressure in the pipeline 32 can be controlled between values determined by these two pressures, that is to say between mains pressure and atmospheric pressure.

Thus, with the valve 34 held open and the valve 36 held closed, the pipeline 32 would be at the same pressure as the pipeline 30, whilst with the valve 34 held closed and the valve 36 held open the pressure within the second diaphragm chamber of pilot valve would be at the pressure of the static head of water in the pipe 32, i.e. at minimal pressure not much greater than atmospheric pressure. In practice, the control pressure required will lie between these two extremes and will be produced by the valves 34 and 36 being opened and closed, selectively, for very brief periods of time to effect minute changes of pressure in pipeline 32.

Either or both of the two valves may be normally closed solenoid valves, which operate by trapping a sealed volume at a known pressure. The solenoids can be pulsed to increase or decrease the pressure and hence adjust the hydraulic set point of the pilot valve. In this way, power is only used when adjusting the solenoids—once the hydraulic set point is fixed the pressure control valve and pilot valve continue to function as normal.

The control applied to the pilot valve will preferably be applied in pulses, the duration of the pulses being varied according to an error signal represented by the difference between required and sensed pressure. Preferably, also, the control applied to the pilot valve will be applied according to a threshold concept, that is to say so that the control only becomes operative when the downstream pressure strays outside a predetermined error band.

The logger or controller may be "self-taught" i.e. may be such that it applies a control for an elementary period of time, measures the resultant change of pressure in relation to the change of pressure required, and then performs a control function for an appropriate period of time to bring about the change required.

Figure 11:
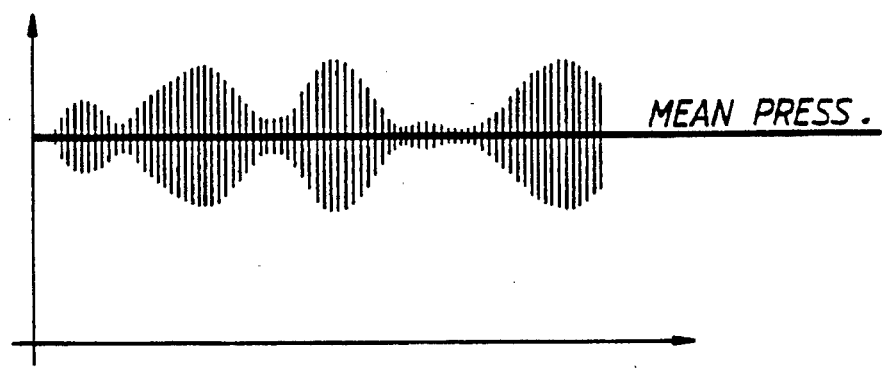
FIG. 11 is a graphical illustration of how the standard deviation of outlet pressure from the mean setting of a regulator may vary according to flow.

One controlling technique will now be explained, by way of example, with reference to FIG. 11 which is a diagrammatic illustration of how, within the water system, the standard deviation of fluid pressure from the mean setting may vary according to flow, that is to say according to the demand for water.

As shown, the minimum deviation is at low rates of flow and the maximum deviation is at full flow. The data logger or controller may be such that it can sample pressure every 1/10 second and derive a series of samples. A summary period is chosen, say 5 minutes, over which period the values of Pmax and Pmin can be monitored and stored in the logger memory. Using an integration technique it is then possible to diagnose whether the flow through the valve is abnormally high for the particular season and, if so, switch to a higher profile during that day.

Figure 12:
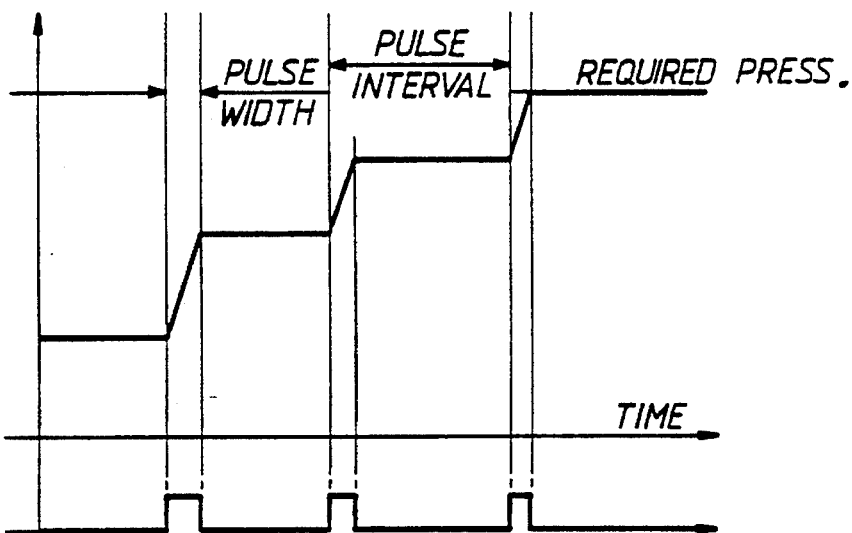
FIG. 12 is a graphical illustration of the application of control signals to a pilot valve in short pulses.

Referring now to FIG. 12, to avoid oscillations (unstable feedback loop) the control may be applied in short pulses, the duration of each pulse being varied according to the difference between required and actual pressure (i.e. according to an error signal).

Figure 13:
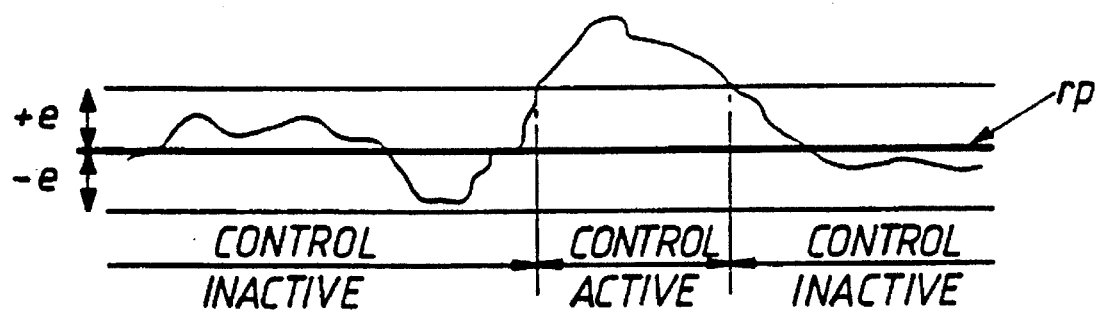
FIG. 13 is a graphical illustration of the application of control according to a threshold concept.

In addition, as illustrated diagrammatically in FIG. 13, the control may be applied according to a so-called threshold concept. In FIG. 13 the required pressure is represented by line rp. A line immediately below line rp represents required pressure less a predetermined threshold value whereas a line immediately above line rp represents required pressure plus the predetermined threshold value.

This arrangement is such that whilst the sensed pressure remains within the error band of rp± threshold value the control remains inactive. The control only becomes operative when the sensed pressure strays outside the error band, this being to achieve the lowest possible battery power consumption in the data-logger.

The control is thus optimised to a minimum number of control operations in order to consume the smallest possible amount of power.

Figure 14:
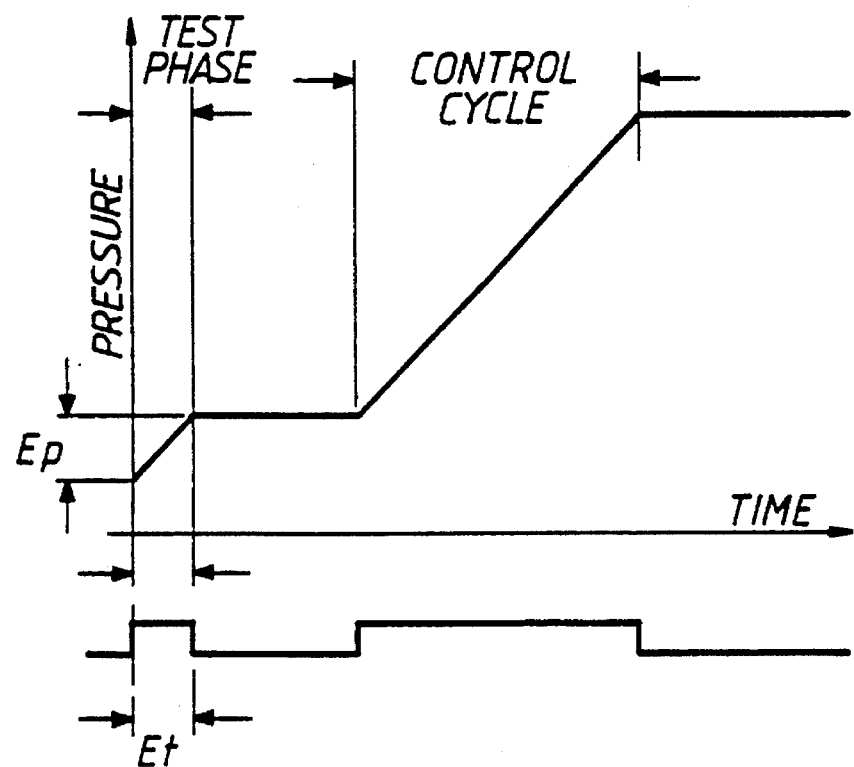
FIG. 14 is a further graphical illustration of the application of control signals.

The data-logger or controller may, in effect, be "self-taught". Referring to FIG. 14, in a test phase the logger applies a control signal for an elementary period of time Et and measures the resultant change in pressure Ep. The gradient Ep/Et is the first order or approximation of the integral term used in the control loop. Once the value of Ep/Et has been derived, this is used to initiate the first control operation, after which a new value of Ep/Et is calculated.

This self-tuning technique may be applied separately to both the valves 34 and 36 by means of which the logger produces a control pressure in line 32 (see FIG. 1) in order to control the operation of pilot valve 16.

Various modifications may be made. For example, instead of taking a high pressure flow of water from the auxiliary flow pipe 18 there could be a supply of bottled gas for feeding a controlled fluid pressure to the second diaphragm chamber 19 of pilot valve 16 via valve 34 and pipeline 32.

One of the advantages of a fluid pressure control apparatus according to the present invention is that it is compact and may be powered for a long duration 3–5 years, by relatively low power battery. In this way it can be located on or near a pressure control valve without any requirement for mains electric power. By using a pilot valve to control the main pressure control valve large pressures can be controlled using relatively small amounts of power. In addition, the pilot control valve according to the present invention can provide the necessary feedback control to maintain the required predetermined pressure value at the pressure control valve.

In one embodiment ("Pressure Profile Control") of the present apparatus, the memory 44 also stores a number of required pressure-time profiles for the water supply flow in the main 14. The CPU is provided with means for comparing the data inputs from the sections 38,40 with the stored pressure profiles and to provide actuating outputs to the valves 34,36 through interface 46. In this way, predictable variations of water demand can be anticipated and the downstream pressure can be maintained more uniformly while ensuring that water at a suitable pressure reaches the furthest extremities and highest altitudes of the district being supplied.

The water pressure control apparatus described is preferably able to maintain supply pressure at all times at the lowest possible values commensurate with meeting the demand for water by consumers furthest away and at the highest points above sea level. The apparatus also provides an economical way of achieving the logging and control functions within one instrument.

Means may be provided for switching the control means to an alternative state for increasing the supply of water as regulated by said pressure reducing valve in response to a signal indicating an abnormally high demand for water and/or in response to a pre-determined minimum pressure signal from a critical point in the district being supplied. In switching to an alternative state, the system may bring into use a different pressure-time profile or may boost the downstream or district pressure by a predetermined amount.

The means for switching the control means to an alternative state for increasing the supply of water as regulated by the pressure reducing valve may be actuable in response to a signal from a critical point indicating a pre-determined minimum pressure at that point, this being either additional or alternative to a signal indicating an abnormally high demand for water. There may be a number of such critical points, these being either at outlying locations or at elevated heights.

In another embodiment ("Flow Modulation"), the memory 44 contains data relating to pressure and flow. As explained in relation to FIGS. 3b and 3c the pressure required at point A can be inferred from a measurement of the flow passing through point A. In this embodiment it is then not necessary to use the pressure time profile modulation.

I claim:

1. A water supply pressure control apparatus for use in conjunction with a pressure control valve of a water supply system, including:

first sensor means for sensing the water pressure at a first point in said water supply system, first control means including a pilot valve for controlling the pressure control valve to control the water pressure at said first point in said water supply system in accordance with a difference between the pressure sensed by the first sensor means and a predetermined pressure value, and second control means for controlling said predetermined pressure value, said second control means including at least one solenoid operated valve located in a pipeline connected to a first diaphragm chamber of the pilot valve, said solenoid operated valve being operable to control the pressure of fluid in said pipeline in accordance with said predetermined pressure value, wherein said solenoid operated valve is of a type which substantially only requires electrical power during adjustment thereof.

2. A water supply pressure control apparatus according to claim 1 wherein the pressure in said pipeline is controlled by a pair of said solenoid operated valves arranged in series, with the said pipeline joining a connecting line between the said solenoid operated valves, one of said solenoid operated valves being connected to a relatively high pressure source and the other to a relatively low pressure source, the control pressure in the pipeline being controllable by selective operation of the pair of solenoid operated valves.

3. A water supply pressure control apparatus according to claim 2 wherein at least one of the pair of solenoid operated valves is a normally closed solenoid valve, which is operable to trap a sealed volume of fluid, and is pulsable to increase or decrease the pressure of the sealed volume of fluid and hence adjust the pressure in said pipeline.

4. A water supply pressure control apparatus according to claim 1, including a battery for supplying electrical power to said solenoid valve.

5. A water supply pressure control apparatus according to claim 1 wherein said pilot valve includes a second diaphragm chamber, said second chamber being connectable to an auxiliary flow pipe the opposite ends of which are connected to tapping points respectively upstream and downstream of the pressure reducing valve.

6. A water supply pressure control apparatus according to claim 1, in which the predetermined pressure value is adjustable by the second control means to reduce fluctuations in the water pressure at a second point in the system.

7. A water supply pressure control apparatus according to claim 1 including first storage means for storing data relating to a required water pressure/time relationship, and wherein the predetermined pressure value is adjustable by the second control means in accordance with said water pressure/time data.

8. A water supply pressure control apparatus according to claim 7, including switching means for switching the second control means to an alternative state, wherein, in said alternative state the second control means no longer adjusts the predetermined pressure value in accordance with said pressure/time data.

9. A water supply pressure control apparatus according to claim 8, wherein the switching means is activatable to switch said control means to said alternative state in response to a signal indicative of an abnormally high demand for water and/or a predetermined minimum pressure at a point in the system.

10. A water supply pressure control apparatus according to claim 1, including second sensor means for sensing the water flow at a first point in the system, and first storage means for storing data relating to a required water pressure/flow relationship, and wherein the predetermined pressure value is adjustable by the second control means in accordance with said water pressure/flow data.

11. A water supply pressure control apparatus according to claim 10, in which the second sensor means includes a water flow meter locatable at a first point in the system.

12. A water supply pressure control apparatus according to claim 10, wherein the second sensor means includes detector means to detect a parameter of the pressure reducing valve, and pressure sensor means to sense water pressure of the water both upstream and downstream of the pressure reducing valve.

13. A water supply pressure control apparatus according to claim 10, including second storage means in which measurements of flow from the second sensor means are storable, and wherein the measurements are averageable over a period of time by the second control means to produce an average water flow value.

14. A water supply pressure control apparatus according to claim 1 including memory means for storing data relating to the operation of the apparatus.

15. A water supply pressure control apparatus according to claim 1 wherein any or all of: the first control means, the second control means, the first storage means, the second storage means, and the memory means including a computer.

16. A water pressure control system including a water pressure control valve, and a water pressure control apparatus, the water pressure control apparatus including first sensor means for sensing the pressure of the water at a first point in the system, and first control means including a pilot valve for controlling the pressure control valve to control the pressure of the water at the first point in the system in accordance with a difference between the pressure sensed by the first sensor means and a predetermined pressure value, wherein the apparatus includes second control means for controlling the predetermined pressure value, said second control means including at least one solenoid operated valve located in a pipeline connected to a first diaphragm chamber of the pilot valve, said solenoid operated valve being operable to control the pressure of fluid in said pipeline in accordance with said predetermined pressure value, wherein said solenoid operated value is of a type which substantially only requires electrical power during adjustment.

17. A method of controlling the water pressure level at a second point in a water supply system including the steps of:
(i) sensing the pressure of the water at a first point in the water supply system using first sensor means,
(ii) using first control means including a pilot valve to control the pressure of the water at the first point in the system in accordance with a difference between the pressure sensed by the first sensor means and a predetermined pressure value, and
(iii) adjusting the predetermined pressure value using second control means, said second control means including a pair of solenoid operated valves arranged in series, wherein a pipeline connected to a first diaphragm chamber of the pilot valve joins a connecting line between the said solenoid operated valves, one of said solenoid operated valves being connected to a relatively high pressure source and the other to a relatively low pressure source, the control pressure in the pipeline being controllable by selective operation of the pair of solenoid operated valves, and
(iv) selectively operating said pair of solenoid operated valves to control the fluid pressure in said pipeline in accordance with said predetermined pressure value.

18. A method according to claim 17 wherein in step (iv) the fluid pressure applied to the pilot valve is applied in pulses, with the duration of the pulses being varied according to an error signal represented by the difference between the predetermined pressure value and the pressure sensed by the first sensor means.

19. A method according to claim 18, wherein said solenoid valves are only operated when the magnitude of said error signal becomes greater than a predetermined level.

20. A method of controlling the water pressure level according to claim 17, wherein the second control means adjusts the predetermined pressure value in accordance with data relating to a required water pressure/time relationship.

21. A method of controlling the water pressure level according to claim 17, wherein water flow sensing means are used to sense the water flow at the first point in the system and the predetermined pressure value is adjusted by the second control means in accordance with data relating to a required water pressure/flow relationship.

22. A water supply pressure control apparatus for use in conjunction with a pressure control valve of a water supply system, including:
first sensor means for sensing pressure of the water at a first point in said water supply system,
first control means for controlling the pressure control valve to control the pressure of the water at said first point in said water supply system in accordance with a difference between the pressure sensed by the first sensor means and a predetermined pressure value,
second control means for controlling said predetermined pressure value to reduce fluctuations in the water pressure at a second point in the system, and,
first storage means for storing data relating to a required water pressure/time relationship, wherein the predetermined pressure value is adjustable by the second control means in accordance with said water pressure/time data,
wherein the first control means includes a pilot valve for controlling the pressure reducing valve, the pilot valve being regulated by the second control means and being located in an auxiliary flow pipe the opposite ends of which are connected to tapping points respectively upstream and downstream of the pressure reducing valve, and wherein the pressure in a pipeline communicating with a diaphragm chamber of said pilot valve is controllable by a pair of electrically operated valves arranged in a series with the said pipeline joining a connecting line between the said valves, one of said valves being connected to a relatively high pressure source and the other to a relatively low pressure source, the control pressure in the pipeline being controllable by selective operation of the pair of valves,
wherein said solenoid operated valves are of a type which substantially only require electrical power during adjustment.

23. A water supply pressure control apparatus for use in conjunction with a pressure control valve of a water supply system, including:
first sensor means for sensing the pressure of the water at a first point in said water supply system,
first control means for controlling the pressure control valve to control the pressure of the water at said first point in said water supply system in accordance with a difference between the pressure sensed by the first sensor means and a predetermined pressure value,
second control means for controlling said predetermined pressure value to reduce fluctuations in the water pressure at a second point in the system, and
second sensor means for sensing the water flow at a first point in the system, and
first storage means for storing data relating to a required water pressure/flow relationship, wherein the predetermined pressure value is adjustable by the second control means in accordance with said water pressure/flow data, and,
wherein the first control means includes a pilot valve for controlling the pressure reducing valve, the pilot valve being regulated by the second control means and being located in an auxiliary flow pipe the opposite ends of which are connected to tapping points respectively upstream and downstream of the pressure reducing valve, and wherein the pressure in a pipeline communicating with a diaphragm chamber of said pilot valve is controllable by a pair of electrically operated valves arranged in series with the said pipeline joining a connecting line between the said valves, one of said valves being connected to a relatively high pressure source and the other to a relatively low pressure source, the control pressure in the pipeline being controllable by selective operation of the pair of valves,
wherein said solenoid operated valves are of a type which substantially only require electrical power during adjustment.

24. A fluid supply pressure control apparatus for use in conjunction with a pressure control valve of a fluid supply system, including
first sensor means for sensing the fluid pressure at a first point in said fluid supply system,
first control means including a pilot valve for controlling the pressure control valve to control the fluid pressure at said first point in said fluid supply system in accordance with a difference between the pressure sensed by the first sensor means and predetermined pressure value, and
second control means for controlling said predetermined pressure value, said second control means including at least one solenoid operated valve located in a pipeline connected to a first diaphragm chamber of the pilot valve, said solenoid operated valve being operable to control the pressure of fluid in said pipeline in accordance with said predetermined pressure value, wherein said solenoid operated valve is of a type which substantially only requires electrical power during adjustment.

25. A water supply pressure control apparatus for use in conjunction with a pilot valve regulated pressure control valve, said apparatus including:

memory means for storing data relating to a desired operation of the apparatus, interface means for receiving data relating to the operation of the apparatus, at least one solenoid operated valve located in a pipeline connectable to a first diaphragm chamber of the pilot valve, said solenoid operated valve being operable to control the pressure of fluid in said pipeline in order to control the pilot valve regulated pressure control valve, and computer control means for receiving data from said memory means and said interface means, and for controlling said solenoid operated valve in accordance with said received data.

26. A water supply pressure control apparatus according to claim 23 wherein at least one of the pair of solenoid operated valves is a normally closed solenoid valve, which is operable to trap a sealed volume of fluid, and is pulsable to increase or decrease the pressure of the sealed volume of fluid and hence adjust the pressure in said pipeline.

27. A water supply pressure control apparatus according to claim 25 including first storage means for storing data relating to a required water pressure/time relationship, and wherein the pressure of fluid in said pipeline is adjustable by the second control means in accordance with said water pressure/time data.

28. A water supply pressure control apparatus according to claim 25, including second sensor means for sensing the water flow at a first point in the system, and first storage means for storing data relating to a required water pressure/flow relationship, and wherein the-pressure of fluid in said pipeline is adjustable by the second control means in accordance with said water pressure/flow data.

* * * * *